Figure 1:
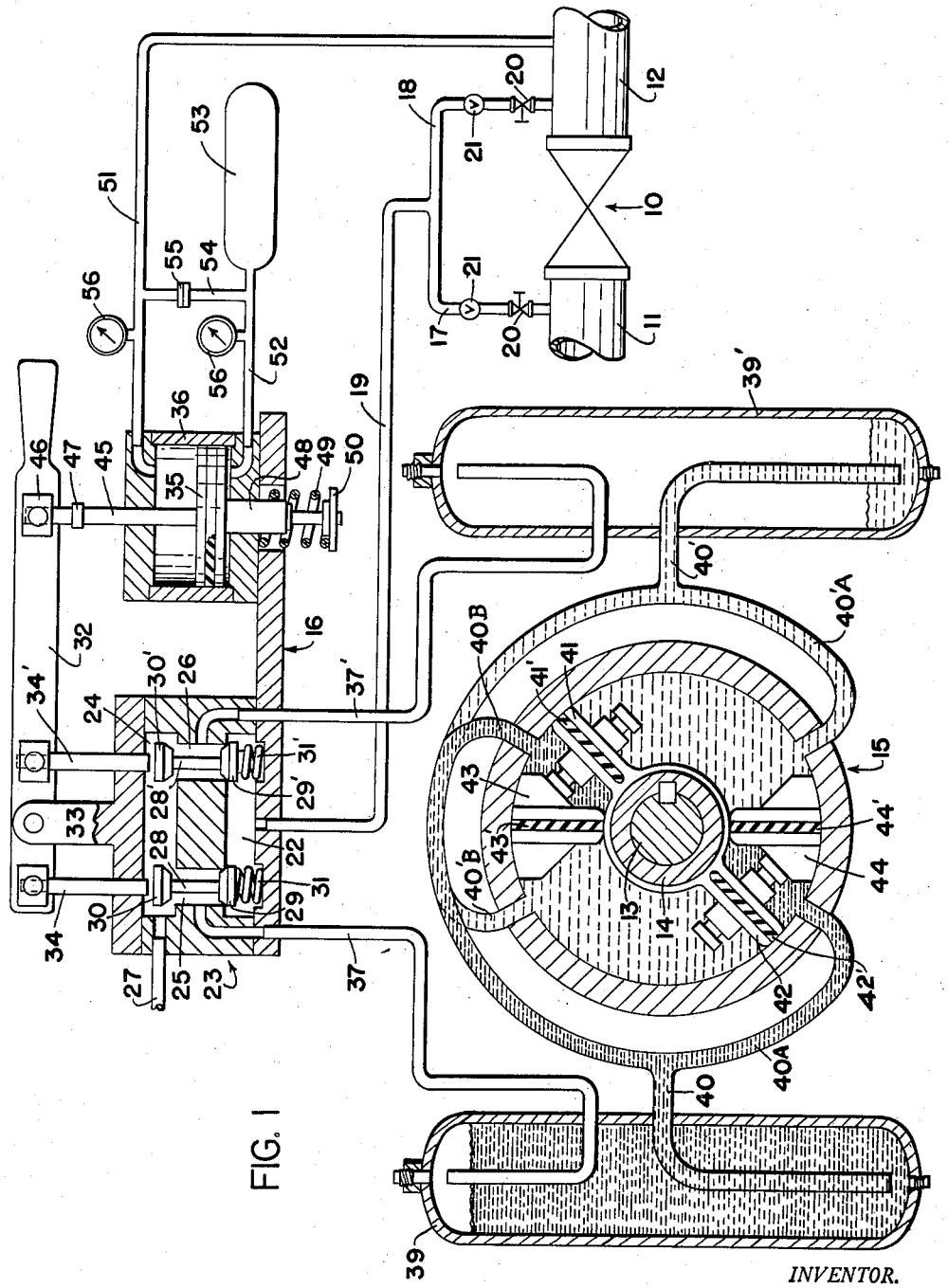

Sept. 2, 1958     H. J. SHAFER     2,849,987
HYDRAULIC VALVE OPERATOR CONTROL SYSTEM
Filed April 13, 1953     2 Sheets-Sheet 1

INVENTOR.
HOMER J. SHAFER
ATTYS

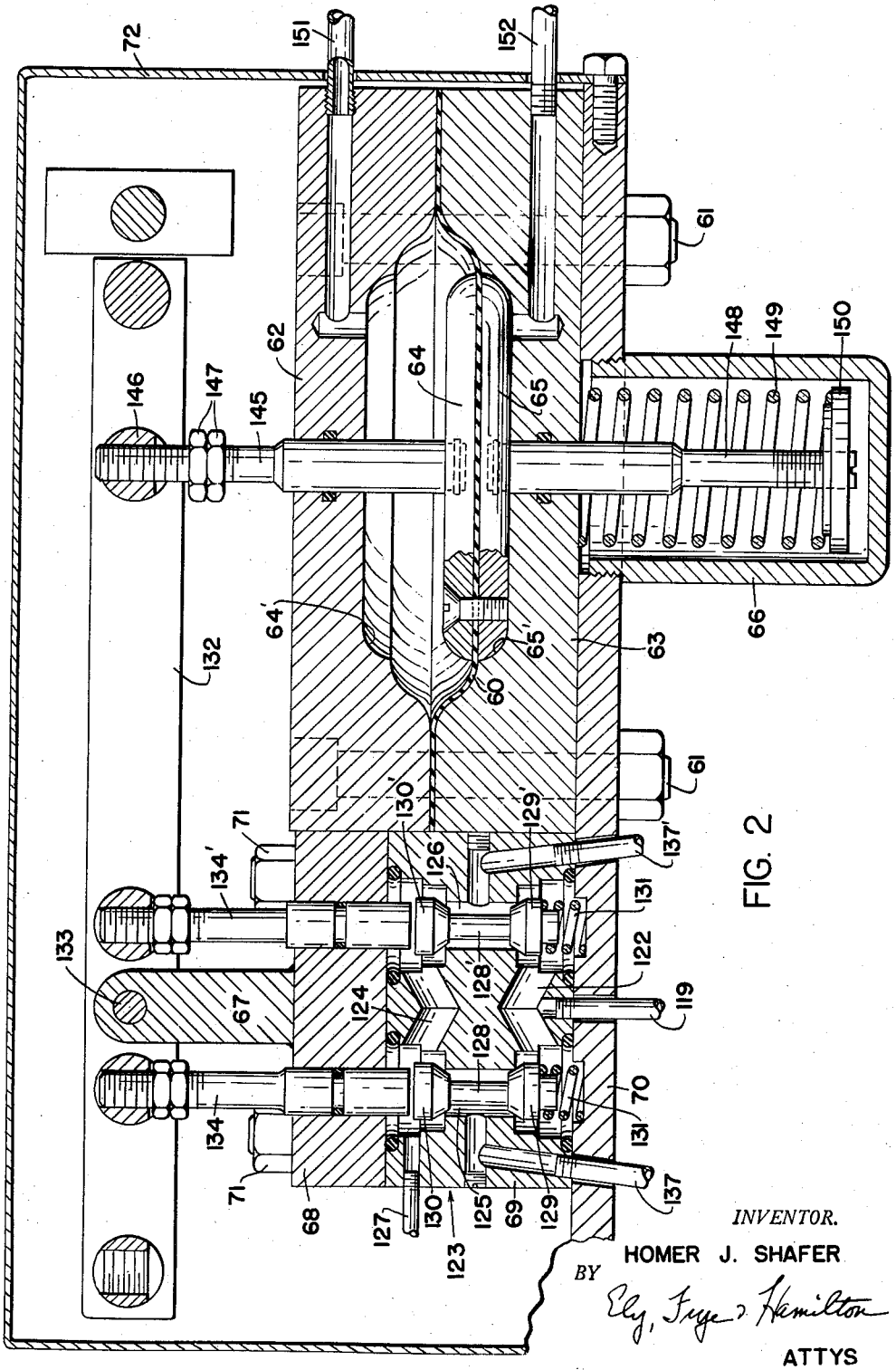

United States Patent Office 2,849,987
Patented Sept. 2, 1958

2,849,987

HYDRAULIC VALVE OPERATOR CONTROL SYSTEM

Homer J. Shafer, Mansfield, Ohio, assignor to Shafer Valve Company, Mansfield, Ohio, a corporation of Ohio Application April 13, 1953, Serial No. 348,354

6 Claims. (Cl. 121—46.5)

The invention relates generally to a hydraulic system for controlling a hydraulic valve operator operating a high pressure valve in a pipe line, and more particularly to a control unit for a valve operator operating under a wide variety of conditions.

In my copending application Serial No. 189,810, filed October 12, 1950, now Patent No. 2,780,432, and entitled Automatic Reclosing Device for Plug and Other Type Valves, I disclose a control system for a hydraulic valve operator, but the system has certain disadvantages, one of the most serious of which is that the piston or vane of the operator is subjected at all times to the full line pressure of the fluid pressure source which actuates the piston. As shown in said application Serial No. 189,810, the fluid pressure source may be the pipe line in which the valve being operated is located, and consequently the piston or vane of the operator may be constantly subjected to excessively high pressures exerting a severe strain on the sealing rings. As a result, the valve may be operated when not desired and the seals are apt to fail and burst the hydraulic system, creating a dangerous condition which may well be disastrous.

In certain other prior control systems for hydraulic high pressure valve operators, line pressure is utilized to operate a piston having a rack bar which drives a gear segment on the valve stem. In such systems not only is the piston subjected constantly to full line pressure, but the valve is automatically closed due to a line break by the differential between full line pressure and reduced line pressure, and after closing there is a pressure build-up behind the piston which may become sufficient to reopen the valve when it is dangerous to do so. Moreover, the piston is operated for automatically closing the valve by means of an auxiliary pressure tank connected to the line through a reduced orifice and with a piston of normal size, a large pressure tank is required to produce sufficient pressure times area to operate the valve.

In this latter type of control system, the piston must be restrained in some way so that it does not operate the valve due to ordinary pressure fluctuations in the line of the order of say, up to 50 pounds. This is often accomplished by applying frictional resistance in the valve to movement of the valve plug, but such an expedient makes the valve inefficient, and difficult to adjust and maintain.

It is an important object of the present invention to provide a novel control system for a hydraulic valve operator in which the operator piston is subjected to full operating pressure only during the operation of the valve.

Another and related object is to provide a novel control system in which a small pressure-operated pilot element controls the flow of pressure fluid to the operator piston and automatically shuts off flow to the piston after the valve is operated.

Still another object is to provide a novel control system having a control unit for automatically operating the valve in one direction and adapted for manual operation to move the valve in either direction.

A further object is to provide a novel control unit for rapid operation of a high pressure valve on the differential between full line pressure and atmospheric pressure.

A still further object is to provide a novel control unit having a pressure-operated pilot element controlling the flow of pressure fluid to the valve operator and adapted to absorb ordinary fluctuations in line pressure without operating the valve.

The foregoing objectives are attained by the novel control system comprising the present invention, which includes an efficient, compact and economical control unit, and which overcomes the aforesaid disadvantages of prior systems.

Preferred embodiments of the invention are shown by way of example in the accompanying drawings and described in detail herein, but it should be understood that various changes and modifications in details of construction and arrangement may be made within the scope of the invention as it is defined in the claims appended hereto.

Referring to the drawings:

Fig. 1 is a schematic view of the novel hydraulic control system applied to a hydraulic rotary vane motor for operating a plug valve in a high pressure pipe line, the pressure-operated pilot element of the control unit being shown as a piston operated by differential pressure in the pipe line; and Fig. 2 is an enlarged sectional view of a modified form of control unit, in which the pressure-operated pilot element is a flexible diaphragm.

In Fig. 1 a high pressure valve is shown schematically at 10 connected between two sections 11 and 12 of the pipe line. This valve may be of the rotary plug type and its stem 13 is keyed to the rotor 14 of a hydraulic rotary vane motor indicated generally at 15 in enlarged cross section.

The pressure fluid which furnishes the power for automatically operating the motor 15 under certain conditions may be derived from the pipe line, and it may be gas, air or liquid under pressure. The pipe line is connected to a control unit indicated generally at 16 and the control unit is connected to the motor 15. Preferably, tap lines 17 and 18 from pipe line sections 11 and 12 are both connected to a power line 19 so that pressure fluid will be supplied to line 19 regardless of a line drop or break on either side of the valve. Lines 17 and 18 are provided with shut-off valves 20, and with check valves 21 preventing return flow in case pressure fails in either side of the line when the plug valve is closed.

The power line 19 is connected to the pressure chamber 22 of a three-position diverter valve indicated generally at 23 having an exhaust valve chamber 24, the chambers 22 and 24 communicating with each other through ports 25 and 26, and exhaust chamber 24 communicating with the atmosphere through a port 27. A pair of double-headed poppet valves is provided in the three-position control valve 23, one valve having a stem 28 in port 25 with its heads 29 and 30 located in chambers 22 and 24 respectively, and other valve having a stem 28' in port 26 with its heads 29' and 30' located in chambers 22 and 24 respectively. The valve heads 29 and 29' are arranged selectively to seat on the lower ends of ports 25 and 26 respectively, and the valve heads 30 and 30' selectively seat on the upper ends of said ports. Preferably the valve heads are of nylon or similar material which provides an especially tight seal, and has extremely long life and high wear resistance. Coil springs 31 and 31' normally hold the valve heads 29 and 29' closed on their seats when the valve is in neutral position, as shown in Fig. 1.

A handle 32 for actuating the two poppet valves is pivoted on the valve housing at 33 and has actuator rods 34 and 34' on opposite sides of the pivot for selectively closing the valve heads 30 and 30' on their seats as the handle is rocked about its pivot. The other end of the handle is operatively connected to a pressure-operated pilot element which is shown in Fig. 1 as a piston 35 movable in a cylinder 36 which is preferably embodied in the countrol unit 16.

In the embodiment shown in Fig. 1, conduits 37 and 37' connect the poppet valves to the motor 15, and preferably the pressure fluid forces a liquid such as oil through the motor in a closed circuit so that the flow through the motor can be easily controlled. Conduit 37 connects port 25 to the upper end of an oil cylinder 39 and conduit 37' connects port 26 to the upper end of an oil cylinder 39'. The lower ends of the cylinders 39 and 39' are connected by conduits 40 and 40' to the motor 15 on opposite sides of the vane of the rotor.

Preferably the rotor 14 is a rotary piston provided with two diametrically opposite vanes 41 and 42 which rotate through substantially 90° between diametrically opposite stationary shoes 43 and 44. The conduit 40 is preferably divided into two branches 40A and 40B, conduit 40A supplying oil under pressure to one side of vane 41 and conduit 40B supplying oil under pressure to the other side, or what may be termed the diagonally opposite side, of the opposite vane 42 so that the pressure supplied through branches 40A and 40B will be applied equally to both vanes and rotate the rotor in a clockwise direction with balanced torque. The conduit 40' is divided into two branches 40'A and 40'B for exhausting oil from the chambers on the opposite sides of the respective vanes as the rotor rotates in a clockwise direction, and for selectively supplying oil under pressure to rotate the rotor in a counter clockwise direction when the flow through the motor is reversed, in which case conduits 40A and 40B become exhaust conduits.

Obviously, instead of dividing conduits 40 and 40' into two branches connected to the motor on diagonally opposite sides of opposite vanes the conduit 40 could communicate with one side of one vane and conduit 40' could communicate with one side of the other vane, and the chambers on diagonally opposite sides of the vanes could be connected by ports passing through the hub 14 of the rotor.

The vanes 41 and 42 are provided with pressure sealing rings 41' and 42', and the shoes 43 and 44 are similarly provided with pressure sealing rings 43' and 44', to substantially prevent any leakage of pressure fluid past the shoes and the impeller vanes as the rotor operates in either direction. The construction of the pressure sealing rings, and also the manner of connecting opposite sides of opposite vanes through the hub of the rotor, is shown in my copending application Serial No. 333,496, field January 27, 1953, now Patent No. 2,778,338.

The pressure-operated pilot element or piston 35 has a piston rod 45 extending upwardly therefrom and its upper end is slidable in a boss 46 pivoted on the outer end of the handle 32. An actuating collar 47 is fixed on the piston rod 45 at such position as to make a delayed or lost-motion connection with the handle as the piston rod is raised. In other words, as the piston rod is raised the rod will slide through the boss without actuating the handle, until the collar engages the boss and raises the outer end of the handle. This lost-motion connection permits manually raising or lowering the handle at any time without moving the piston 35, and such manual operation can be done in progressive steps, to open or close the valve a little at a time.

The piston 35 has a lower piston rod 48 extending downwardly through the bottom wall of the cylinder 36, and the cross-sectional area of rod 48 is larger than that of upper rod 45 so that the pressure-effective area of the upper side of the piston 35 is greater than that of its under side, which keeps the piston normally in the lower end of the cylinder under conditions of equal pressure supplied to both ends. A coil spring 49 may be interposed between the cylinder and a washer 50 on the lower piston rod to provide an additional force urging the piston toward the lower end of the cylinder.

The upper end of the cylinder 36 is connected to a source of pressure fluid by the conduit 51, and the source may be the pressure in the pipe line in which the valve 10 is located. Thus conduit 51 is shown tapped into pipe line section 12. It will be understood that other sources of fluid pressure may be utilized to operate the pilot piston if desired. As shown, the lower end of pilot cylinder 36 is connected by a conduit 52 to an auxiliary pressure or expansion tank 53 which is in turn connected to the source of pressure fluid by a conduit 54 having a restricted orifice indicated at 55. Suitable pressure gauges 56 may be provided in the conduits 51 and 52.

In the operation of the improved system, assuming that the valve 10 is normally open with the rotor 14 in the position shown, the pressure in the pipe line is communicated through conduit 19 to the pressure chamber 22 of the diverter valve and the valves 29 and 29' close off the pressure supply because the valve handle is in neutral position. Pressure fluid from the pipe line also is supplied to both ends of pilot cylinder 36 through conduits 51 and 52, and the piston 35 is maintained in the lower end of the cylinder 36 due to the greater pressure effective area of the upper side of the piston, aided by the spring 49. Now if the pressure in either side of the pipe line should drop substantially, as in case of a line break, before the drop can take effect on the tank 53 through the reduced orifice 55, the greater pressure in line 52 will raise the piston 35 to the top of the cylinder, overcoming the lost motion gap and raising the outer end of handle lever 32 and lowering the actuator rod 34 at the other end. In this connection it is noted that the lost motion connection between rod 45 and handle 32 allows some floating of the piston 35 due to ordinary fluctuations in line pressure, without actuating the lever 32.

When the actuator rod 34 is lowered it closes valve head 30 and opens valve head 29 against the action of spring 31, but actuator rod 34' has no effect on valves 30' and 29'. Thus pressure fluid from conduit 19 and chamber 22 flows through conduit 37, forcing oil from cylinder 39 through conduits 40A and 40B into the motor and rotating the rotor clockwise to close valve 10 while exhausting oil through conduits 40'A and 40'B into cylinder 39'. As the oil fills cylinder 39' the air therein is exhausted through conduit 37' to exhaust chamber 24 and thence through exhaust port 27. A short time after the valve 10 is thus closed, the pressure in lines 51 and 52 will become equalized due to flow through the restricted orifice 55, and the pilot piston will drop, allowing the spring 31 under poppet 29 to close the valve and return the handle 32 to neutral position. This shuts off the pressure fluid supply from the motor 15 until the control lever is again operated, and in order to reverse the flow through the motor by depressing actuator rod 34' it is necessary to manually actuate the outer end of the control lever 32. This has no effect on the piston 35 because of the lost motion connection.

Thus, the operator motor 15 is subjected to full pressure only during the operation of the valve, after which the pilot valve drops and allows the diverter valve to shut off the pressure. Any slight amount of leakage past either valve 29 or 29' which might possibly occur due to wear or foreign matter on the seat, would blow equally to both sides of the vanes in the motor and to exhaust, thus preventing operation of the motor and signalling the presence of a leak.

Obviously, the control system could be reversed to open the valve 10 automatically by a change in pressure and to require manual closing.

Referring to the modified form of control unit shown in Fig. 2, the construction and operation of this unit is similar to the form shown in Fig. 1, except that the pressure operated pilot element 60 is a flexible diaphragm instead of a rigid movable piston. The diaphragm 60 is clamped around its outer peripheral portion by bolts 61 between the plates 62 and 63 forming the upper and lower parts of the pilot pressure chamber. The central portion of the diaphragm is reinforced on opposite sides by plates 64 and 65 preferably having rounded edges and recesses 64' and 65' are formed in the plates 62 and 63 respectively for conforming within close tolerances to said reinforcing plates. Such a diaphragm is more sensitive to pressure changes of small magnitude than a piston, and yet because of the close fit of the plates 64 and 65 in their respective recesses, it will withstand pressures of 1000 p. s. i. or more without bursting.

Pressure fluid is supplied from an expansion tank by the conduit 152 to the under side of the diaphragm, and from the pressure source to the recess at the upper side of the diaphragm by conduit 151. A rod 148 extends downwardly from plate 65 and is urged in a downward direction by a spring 149 engaging a washer 150 on the bottom of the rod, said spring being enclosed in a housing 66. A rod 145 extends upwardly from plate 64 through plate 62 and fits slidably in a boss 146 pivoted on the free end of the control lever 132. The upper end of the rod 145 is threaded and nuts 147 screwed thereon form an adjustable lost motion abutment shoulder for actuating the lever 132.

The control lever 132 is pivoted at 133 on an arm 67 projecting upwardly from the head 68 of the diverter valve 123, which has a body 69, the head and body being mounted on the base plate 70 of the unit by bolts 71. The pressure and exhaust chambers 122 and 124 formed in body 69 are interconnected by ports 125 and 126, in which the stems 128 and 128' of the double headed poppet valves are located. Stem 128 has nylon heads 129 and 130 thereon, and stem 128' has nylon heads 129' and 130' thereon, valves 129 and 130 being actuated by a rod 134 attached to lever 132 on one side of pivot 133 and valves 129' and 130' being actuated by a rod 134' attached to lever 132 on the other side of pivot 133. Coil springs 131 normally hold valve heads 129 and 129' on their seats. Conduit 119 connects the pressure chamber 122 to the pressure fluid supply and conduits 137 and 137' connect the ports 125 and 126 to opposite sides of the motor which operates the main valve. Conduit 127 connects the exhaust chamber 124 to the atmosphere.

By removing the nuts 71 of the mounting bolts the head 68 together with the lever 132 and actuator rods 134 and 134' can be easily removed from the body. This makes the upper nylon valve heads 130 and 130' readily accessible for repair or replacement. The lower nylon valve heads 129 and 129' are readily accessible by removing body 69 from plate 70. As shown, the control unit may be enclosed in a casing 72 secured to the base plate 70.

In both embodiments of the novel control system, the small pressure operated pilot element requires a small pressure tank, and is returned after the main valve is operated to a neutral position wherein the pressure on the pressure sealing rings of the hydraulic operator motor is shut off. Thus the danger of bursting the system or reopening the valve at the wrong time is eliminated. The operation of either the pilot piston or pilot diaphragm in the event of a line break is substantially instantaneous because it is moved by the differential between full line pressure and atmospheric pressure, but at the same time it is not operated by ordinary fluctuations in line pressure because of the lost motion connection between the pilot element and the control lever.

As compared with prior control systems utilizing line pressure to operate a piston geared directly to the main valve stem, the present control system is small, compact and efficient, while having the important advantage of subjecting the valve operator piston to full line pressure only during operation of the valve.

What is claimed is:

1. A hydraulic control unit for operating a piston and having a diverter valve, means for connecting a source of pressure fluid to said diverter valve, means for connecting opposite sides of said piston to said diverter valve, said diverter valve normally closing off said pressure fluid source and being operable to selectively admit pressure fluid to and exhaust it from opposite sides of said piston, a handle for said diverter valve, said control unit having a pressure-operated pilot element, means operatively connecting said element to said handle for automatic operation of the piston in one direction, and there being a lost motion connection between the element and handle permitting manual operation of the handle in the opposite direction.

2. A hydraulic control unit for operating a piston and having a diverter valve, means for connecting a source of pressure fluid to said diverter valve, means for connecting opposite sides of said piston to said diverter valve, said diverter valve normally closing off said pressure fluid source and being operable to selectively admit pressure fluid to and exhaust it from opposite sides of said piston, a handle for said diverter valve, said control unit having a pressure-operated pilot element, means operatively connecting said element to said handle for automatic operation of the piston in one direction, there being a lost motion connection between the element and handle permitting manual operation of the handle in the opposite direction, and means returning the pilot element to its normal position after automatic operation of said handle.

3. A hydraulic control unit for operating a piston and having a diverter valve, means for connecting a source of pressure fluid to said diverter valve, means for connecting opposite sides of said piston to said diverter valve, said diverter valve normally closing off said pressure fluid source and being operable to selectively admit pressure fluid to and exhaust it from opposite sides of said piston, a handle for said diverter valve, said control unit having a pressure-operated pilot element, a source of operating pressure fluid connected to one side of said pilot element, an auxiliary pressure tank connected to the other side of said element, conduit means having a restricted orifice connecting said auxiliary pressure tank to said source of operating pressure fluid, means operatively connecting said element to said handle for automatic operation of the piston in one direction, and there being a lost motion connection between the element and handle permitting manual operation of the handle in the opposite direction.

4. A hydraulic control unit for operating a pressure element and having pressure and exhaust chambers and two valve ports connecting said chambers, a valve in each port having heads at each end adapted selectively to close the pressure and exhaust chambers, means normally closing the valve heads at the pressure chamber ends of said valve ports, means for connecting one valve port to one side of the pressure element, means for connecting the other valve port to the other side of said pressure element, a control lever for selectively actuating the valves in said valve ports to connect said pressure and exhaust chambers with opposite sides of said pressure element, a pressure-operated pilot element, and means providing a lost motion connection between said pilot element and said control lever for permitting manual operation of said lever in either direction and providing automatic operation of said lever in one direction.

5. A hydraulic control unit for operating a pressure element and having pressure and exhaust chambers and two valve ports connecting said chambers, a valve in each port having heads at each end adapted selectively to close the pressure and exhaust chambers, means normally closing the valve heads at the pressure chamber ends of said valve ports, means for connecting one valve port to one side of the pressure element, means for connecting the other valve port to the other side of said pressure element, a control lever for selectively actuating the valves in said valve ports to connect said pressure and exhaust chambers with opposite sides of said pressure element, a pressure-operated pilot element, a source of operating pressure fluid connected to one side of said pilot element, an auxiliary pressure tank connected to the other side of said pilot element, conduit means having a restricted orifice connecting the auxiliary pressure tank to said source of operating pressure fluid, means operatively connecting said pilot element to said control lever for automatic operation of said pressure element in one direction, and means providing a lost motion connection between said pilot element and said control lever for permitting manual operation of said lever in either direction and providing automatic operation of said lever in one direction.

6. A control unit for a hydraulic motor including a diverter valve having a housing forming pressure and exhaust chambers, conduit means for connecting said pressure chamber with a source of pressure fluid, conduit means for connecting said pressure and exhaust chambers with said hydraulic motor, independent valve elements in said diverter valve for controlling the flow from said pressure and exhaust chambers and normally closing off flow from said pressure chamber, a control lever pivoted on said diverter valve housing for selectively operating said valve elements, a pressure operated pilot element, and connection means between said pilot element and said control lever for automatically operating said lever in one direction, said connection means including a lost motion device permitting independent manual operation of said lever in either direction.

References Cited in the file of this patent
UNITED STATES PATENTS

| | | |
|---|---|---|
| 1,547,830 | Shortt | July 28, 1925 |
| 1,648,710 | Wright | Nov. 8, 1927 |
| 1,887,322 | Nettleton | Nov. 8, 1932 |
| 1,893,462 | Wait | Jan. 3, 1933 |
| 1,928,461 | Pelouch | Sept. 26, 1933 |
| 2,054,258 | Kinzie | Sept. 15, 1936 |
| 2,078,231 | Brisbane | Apr. 27, 1937 |
| 2,082,940 | Brisbane | June 8, 1937 |
| 2,168,255 | Bischoff | Aug. 1, 1939 |
| 2,240,163 | Pick | Apr. 29, 1941 |
| 2,390,882 | Hopkins | Dec. 11, 1945 |
| 2,409,765 | Kehle | Oct. 22, 1946 |
| 2,432,502 | Bentley | Dec. 16, 1947 |
| 2,435,968 | Kalix | Feb. 17, 1948 |
| 2,444,391 | Whitfield | June 29, 1948 |
| 2,547,862 | Gilmore | Apr. 3, 1951 |
| 2,594,689 | Sharp | Apr. 29, 1952 |